United States Patent

Kamon et al.

[11] Patent Number: 6,002,492
[45] Date of Patent: Dec. 14, 1999

[54] IMAGE READING DEVICE

[75] Inventors: Koichi Kamon, Takatsuki; Hideo Kumashiro, Fukuyama; Hiroshi Murakami, Toyokawa, all of Japan

[73] Assignee: Minolta Co., Ltd., Osaka, Japan

[21] Appl. No.: 08/748,658

[22] Filed: Nov. 14, 1996

[30] Foreign Application Priority Data

Nov. 17, 1995 [JP] Japan .................................. 7-323833

[51] Int. Cl.⁶ .................................................. H04N 1/387
[52] U.S. Cl. ........................... 358/450; 358/498; 382/284
[58] Field of Search ..................... 358/498, 450, 358/496, 451, 452, 453; 382/284, 268; 399/194

[56] References Cited

U.S. PATENT DOCUMENTS

| | | | |
|---|---|---|---|
| 5,452,105 | 9/1995 | Tamagaki et al. | 358/453 |
| 5,465,163 | 11/1995 | Yoshihara et al. | 358/450 |
| 5,592,304 | 1/1997 | Udagawa et al. | 358/450 |
| 5,625,720 | 4/1997 | Miyaza et al. | 358/450 |
| 5,721,624 | 2/1998 | Kumashiro et al. | 358/451 |

FOREIGN PATENT DOCUMENTS

| | | |
|---|---|---|
| 3-210873 | 9/1991 | Japan . |
| 8-211513 | 8/1996 | Japan . |

*Primary Examiner*—Thomas D. Lee
*Attorney, Agent, or Firm*—Burns, Doane, Swecker & Mathis LLP

[57] ABSTRACT

The present invention provides an apparatus which separately reads and combines a plurality of partial images of a large document so as to produce simply and accurately produce a composite image of excellent precision at the joint boundary of each partial image without complex positioning operation.

15 Claims, 10 Drawing Sheets

Fig. 9
| | document L overlap data | document R overlap data | corrected data |
|---|---|---|---|
| horizontal line | 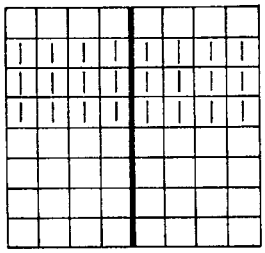 | 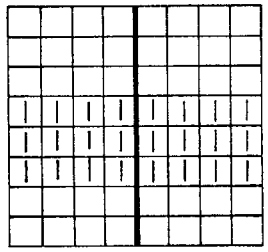 | 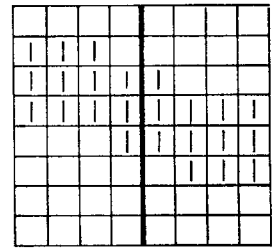 |
| oblique line | 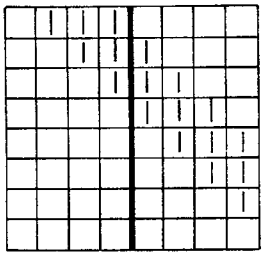 |  | 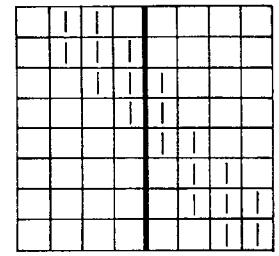 |
| isolated pattern | 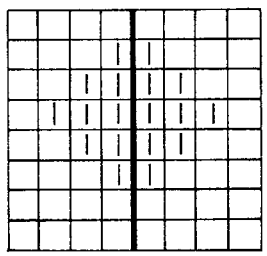 | 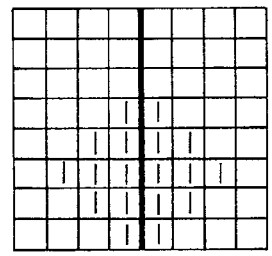 | 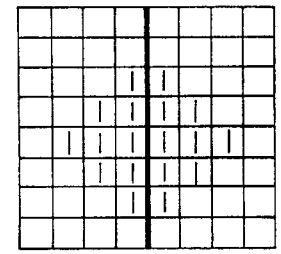 |

Fig. 10

| | document L overlap data | document R overlap data | corrected data |
|---|---|---|---|
| vertical line | | | |
| dot line | | | |

IMAGE READING DEVICE

BACKGROUND OF THE INVENTION

1. Field of the Invention

The present invention relates to an image reading device provided with an automatic document feeding means, and a function for reading and combining a plurality of partial images.

2. Description of the Related Art

Japanese Unexamined Patent Application No. HEI 3-210873 discloses an image reading device for reading partial areas by reading a partial area of a large-size document, comparing the partial image data of said partial area with the partial image data of another partial area of another previously read partial area of said large-size document, and determining whether or not the two partial image data have an overlapping area via pattern matching, so as to set conditions of overlapping areas.

Japanese Unexamined Patent Application No. HEI 3-222573 discloses a device for reading and combining a plurality of partial images.

Japanese Unexamined Patent Application No. HEI 3-210873 discloses a device wherein overlapping areas of the aforesaid partial area and the aforesaid other partial area are readily avoided because the relative position of the reading device relative to said partial area of a document is determined by an operation performed by an operator. In this instance, the operation is complicated by the necessity of once again performing position determination. Furthermore, a relative dislocation of overlapping areas occurs due to the position determining operation even when positioning can be determined so as to produce an overlap area; this situation complicates the pattern matching process, consumes much time, and readily generates errors.

In the device disclosed in Japanese Unexamined Patent Application No. HEI 3-222573, pattern matching by overlap areas cannot be accomplished naturally because each partial image does not have an overlap area. therefore, dislocation is readily generated at the boundary regions of adjacent partial images.

SUMMARY OF THE INVENTION

An object of the present invention is to provide an image reading device which eliminates the previously described disadvantages.

Another object of the present invention is to provide a device which separately reads and combines a plurality of partial images of a large document so as to simply and accurately produce a composite image of excellent precision at the joint boundary of each partial image without complex positioning operations.

The present invention is an image reading device provided with functions for reading, combining, and outputting a plurality of partial images, said image reading device comprising an automatic document feeding means for transporting a document onto a document table and transporting said document in the same direction after an image reading operation to remove the document from the document table, and a transport control means for transporting a document after an image reading operation so that the trailing edge area of the reading range in the transport direction of a previous reading operation becomes the leading edge area of the reading range in the transport direction of the next reading operation.

BRIEF DESCRIPTION OF THE DRAWINGS

FIGS. 9 and 10 show an overlap correction data table;

Figure 1:
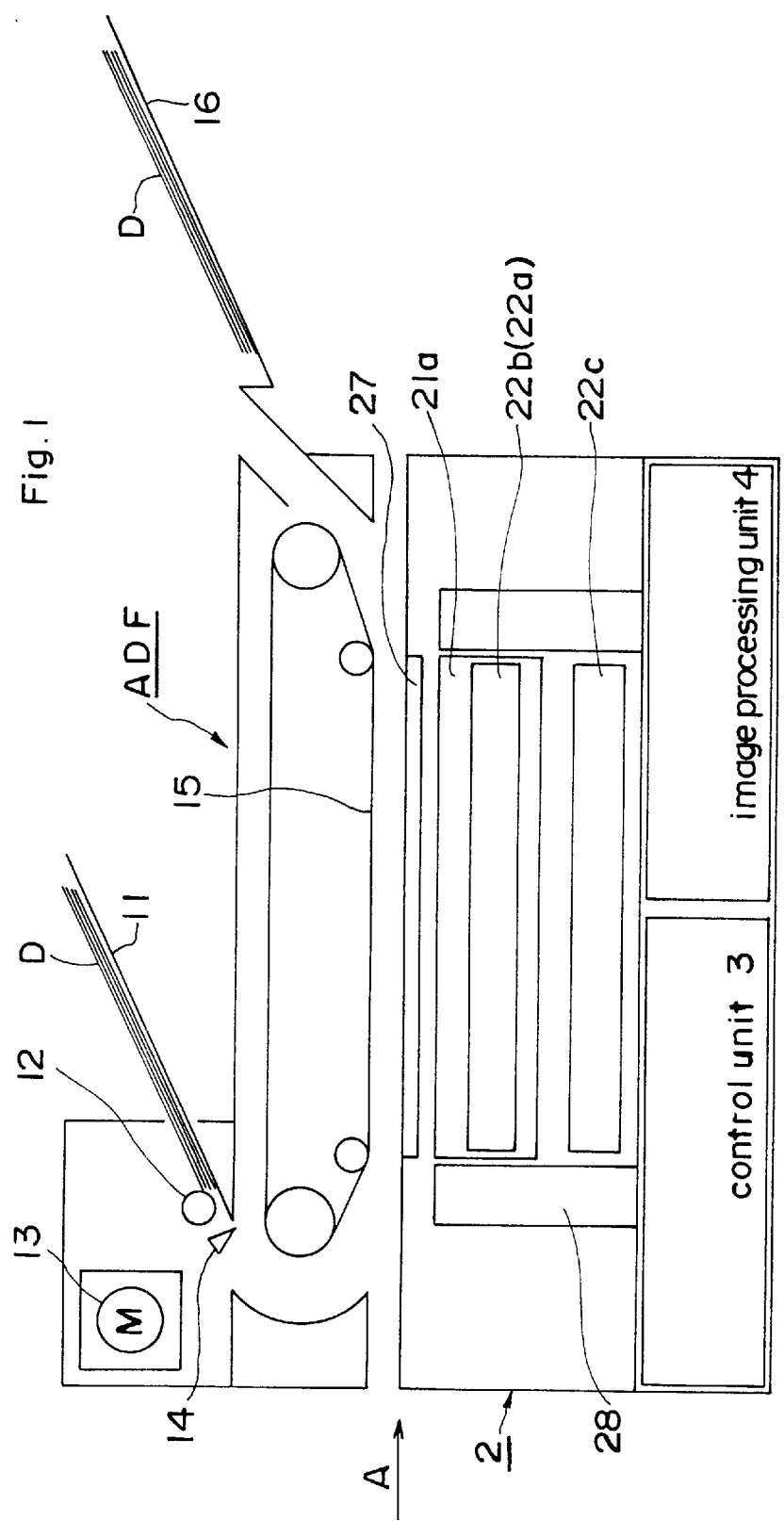
FIG. 1 is an elevation view (i.e., viewed from the arrow B direction in FIG. 2) showing the construction of the image reading device of the present invention.

The present invention is described hereinafter by way of the preferred embodiments with reference to the accompanying drawings.

DESCRIPTION OF THE PREFERRED EMBODIMENTS

The present invention is an image reading device with a function for reading, combining, and outputting a plurality of partial images, and comprises an automatic document feeding device for transporting a document onto a document table, and transporting said document in the same direction after an image reading operation so as to remove said document from said document table, and a transport control means for transporting a document after a reading operation such that the trailing edge of a partial area in the transport direction of the reading range of the previous reading operation becomes the leading edge of a partial area in the transport direction of the reading range of the next reading operation.

Furthermore, in the image reading device of the aforesaid construction, the trailing edge of a partial area in the transport direction within the reading range of a previous image reading operation is the same size as the leading edge partial area in the transport direction within the reading range of the next reading operation.

An area read as the trailing edge partial area in a previous reading operation is read as the leading edge partial area in the next reading operation, and this becomes the overlap area.

The present invention is an image reading device with a function for reading, combining, and outputting a plurality of partial images, and comprises an automatic document feeding device for transporting a document onto a document table, and transporting said document in the same direction after an image reading operation so as to remove said document from said document table, a determination means for determining whether or not the trailing edge part in the document transport direction of an area subjected to a reading operation is included in the reading range of said reading operation, and a transport control means for transporting a document after a reading operation is completed such that the trailing edge area in the transport direction of the reading range of said reading operation becomes the leading edge area in the transport direction of the reading range of the next reading operation when said determination means determines that the trailing edge of the document is not included in the reading range.

When the trailing edge of the document sheet is not included in the reading range, the document is transported after the current reading operation is completed, so as to read the area read as the trailing edge area in the current reading operation as the leading edge area in the next reading operation.

The device of the present invention may be a device of a type wherein a scanner (e.g., a CCD line sensor or member having a light source and reflective mirror or the like) or the like is moved while the document is stationary during the image reading operation, or may be a device of a type which transports the document at a predetermined speed during the image reading operation.

The specific modes of the preferred embodiments of the present invention are described below with reference to the accompanying drawings.

1. Construction

Figure 2:
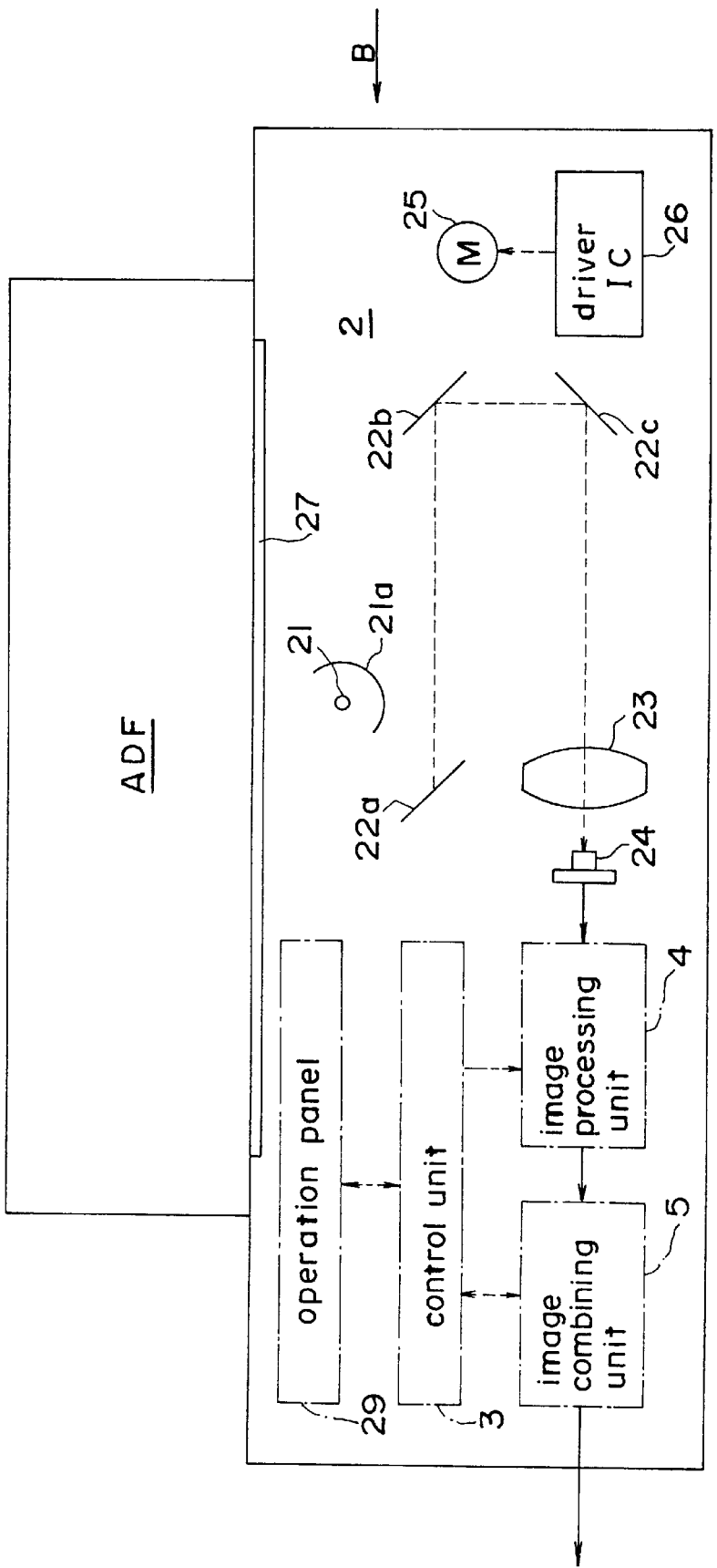
FIG. 2 shows the construction of the image reading unit of the image reading device of FIG. 1 (viewed from the arrow A direction of FIG. 1.

FIGS. 1 and 2 show an example of the device of the present invention. FIG. 1 shows a view in the arrow B direction of FIG. 2, and FIG. 2 shows a view from the arrow A direction of FIG. 1.

The device of the drawings comprises an automatic document feeder (ADF) for feeding a document D from a feed tray 11, positioning said document D on a glass document table 27 with the image surface face down, removing said document D from the document table 27 after the image reading ends by transporting said document D in the same direction as the feeding direction so as to discharge said document D to discharge tray 16, and a reading device 2 for reading said document D positioned on document table 27 and generating image data therefrom.

Figure 3:
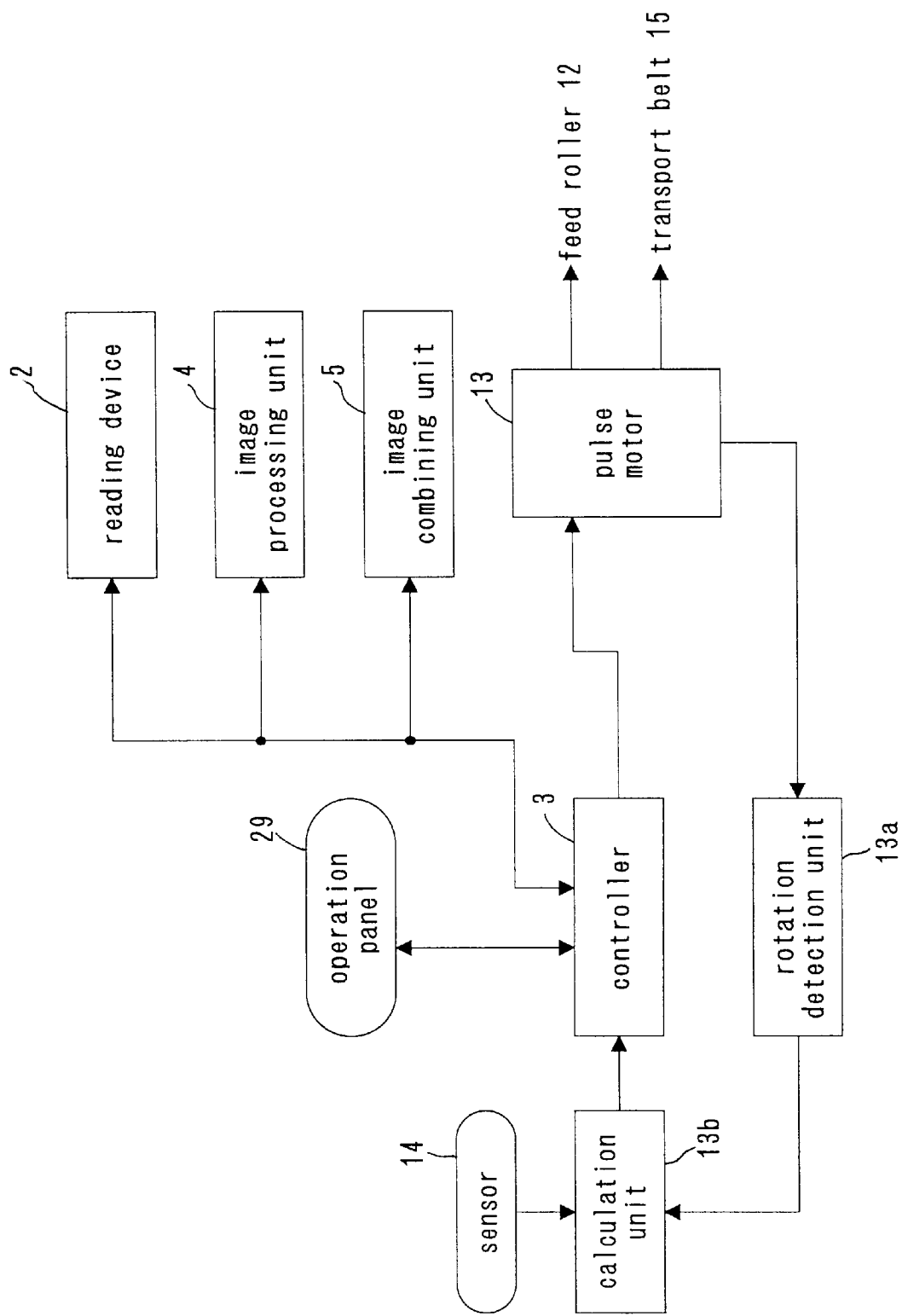
FIG. 3 is a block diagram showing the construction of the control circuit of the image reading device of FIG. 1.
Figure 4:
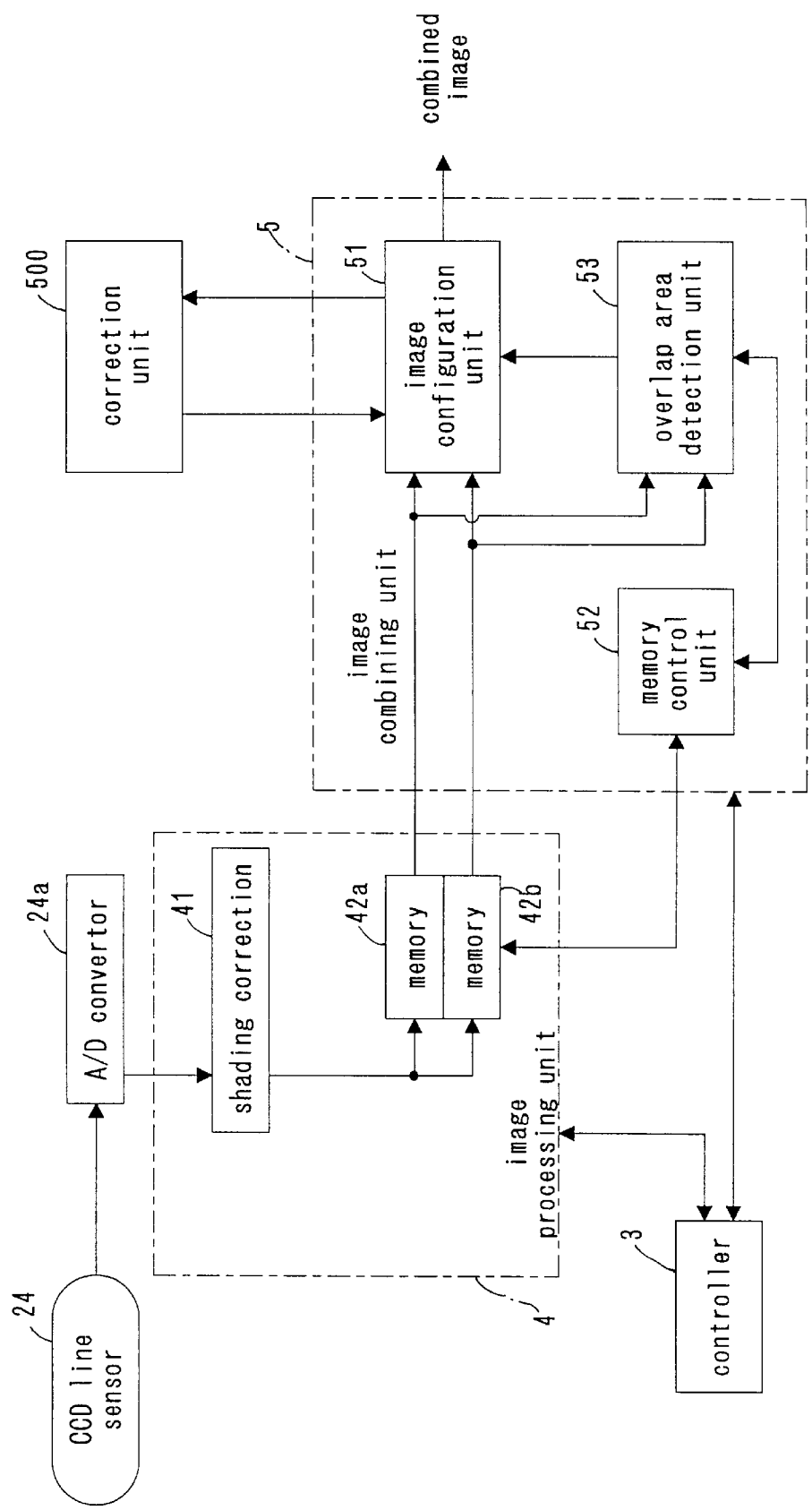
FIG. 4 is a block diagram showing the construction f the image processing circuit of the image reading device of FIG. 1.

The automatic document feeder (ADF) is provided with a feed roller 12 for feeding documents D stacked on tray 11 sequentially sheet by sheet from the uppermost document, a sensor 14 for detecting document D fed by feed roller 12, transport belt 15 for transporting document D which has passed the position of sensor 14 and stops said document D at a predetermined position on glass document table 27 and again transports document D after the image reading is completed and ejects document D to discharge tray 16, pulse motor 13 for driving feed roller 12 and transport belt 15. The actuation of pulse motor 13 is controlled by a control unit 3, as shown in FIG. 3. The rotation of pulse motor 13 is detected by a sensor (e.g., a rotary encoder or the like) not shown in the illustration, and transmitted to a rotation detection unit 13a. The rotation detection unit 13a transmits data corresponding to the number of rotations of pulse motor 13 to a calculation unit 13b. FIG. 3 is a block diagram briefly showing part of the construction of the circuits for controlling the entire device (e.g., detection signals from CCD sensor 24 included in the image reading unit 2 are subjected to analog-to-digital (A/D) conversion, and subsequently transmitted to image processing unit 4 (shown in FIG. 4)). FIG. 4 is a block diagram of component functions showing the construction of a circuit for processing and combining image data. In FIGS. 3 and 4, like parts are designated by like reference numbers.

Reading device 2 reads a document placed with the image surface face downward on glass document table 27 via a well-known optical scanning device (i.e., a device comprising a light source 21, reflective concave mirror 21a, reflective flat mirrors 22a, 22b, 22c, lens unit 23, CCD line sensor 24, drive motor 25, driver IC 26 and the like), converts the read data to electrical signals, transmits said electrical signals to an image processing unit 4 which generates image data via well-known image processing (e.g., A/D conversion shading correction, variable magnification and the like), and outputs said image data from the device. In the case of modes which combine a plurality of separately read partial images, image data of each partial image processed by the image processing unit 4 is connected in image combining unit 5, and output from the device.

The optical scanning device is a device which projects the image reflection light of a document placed on glass document table 27 onto the CCD line sensor 24 in line units via a lens unit 23 by moving a first moving body (not illustrated) provided with a light source 21, concave reflecting mirror 21a, and a reflecting mirror 22a, and moving a second moving body (not illustrated) provided with reflecting mirrors 22b and 22c. The movement speed of the first moving body is double the movement speed of the second moving body. The first moving body and the second moving body are driven by a scanner driving mechanism 28 connected to a drive motor 25.

CCD line sensor 24 generates electrical signals for each pixel of a line in correspondence to the reflected image light in line units formed as previously described, and outputs said electrical signals to image processing unit 4.

When a variable magnification process is executed in modes combining separately read partial images, the scanning speed of the optical scanning device (movement speeds of the first and second moving bodies) change in conjunction with the variable magnification processing of image data performed in image processing unit 4. That is, the scanning speed is changed from a standard speed (i.e., the speed of equal 1:1 magnification) to a speed suitable for the set variable magnification. This change of scanning speed can be executed using well-known methods for changing the speed of the drive motor 25 of the optical scanning device from a standard speed to a speed corresponding to the variable magnification. For example, if parts of a large document are read separately and subsequently combined after reducing the surface area by ½, the scanning speed is changed to 2.5 times the standard speed.

In the mode for combining separately read partial images, each part is read so that the boundary between adjacent partial images has a mutually overlapping area, said partial images are subjected to A/D conversion and shading correction and the like, and subsequently read in sequence for storage in image memory 42a and image memory 42b shown in FIG. 4, and each partial image is thereafter joined at said overlap area. This joining process is accomplished by image memories 42a and 42b, and image combining unit 5. The overlap area correction unit 500 is described later.

First, the various partial image data stored in image memories 42a and 42b are read out by memory control unit 52, and stored in overlap area detection unit 53. In overlap detection unit 53, mutually overlapping areas are recognized via well-known pattern matching methods performed on the various partial image data. The addresses expressing the boundary line between the recognized overlap area and the non-overlap area (i.e., the addresses in image memory 42a and image memory 42b) are stored in memory control unit 52, and image data resulting from the completed pattern matching are stored in image memory 42a and image memory 42b.

Then, the partial image data stored in image memories 42a and 42b are read out by memory control unit 52 based on the addresses expressing the boundary line of the overlap area and the non-overlap area, and sequentially combined by image combining unit 51, then output from the device. That is, two partial images are combined so as to include the image data of the overlap area of one partial image, then output from the device.

Among the data stored in the image configuration unit 51, the overlap area data b and data c are corrected by overlap area correction unit 500.

The correction performed by overlap area correction unit 500 is described hereinafter with reference to FIGS. 7 through 10.

Figure 7:
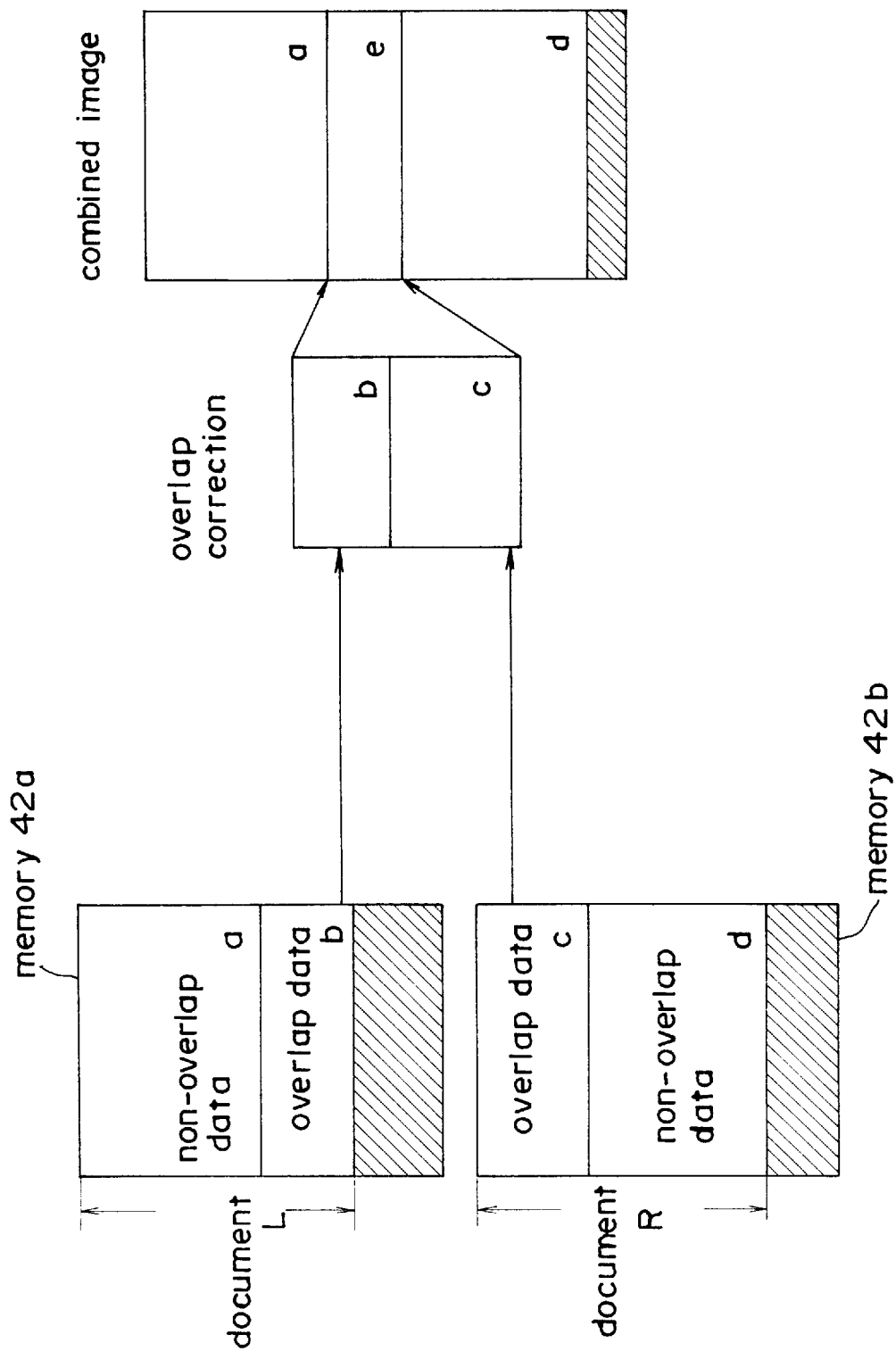
FIG. 7 is a conceptual illustration of an obtained composite image.

FIG. 7 is a conceptual view snowing image data (hereinafter referred to as "document L") stored in image memory 42a and image data (hereinafter referred to as "document R") stored in image memory 42b being corrected and used to produce a composite image.

Document L includes non-overlap data of data a and overlap data of data b, and document R includes non-overlap data of data c and overlap data of data d.

Figure 8:
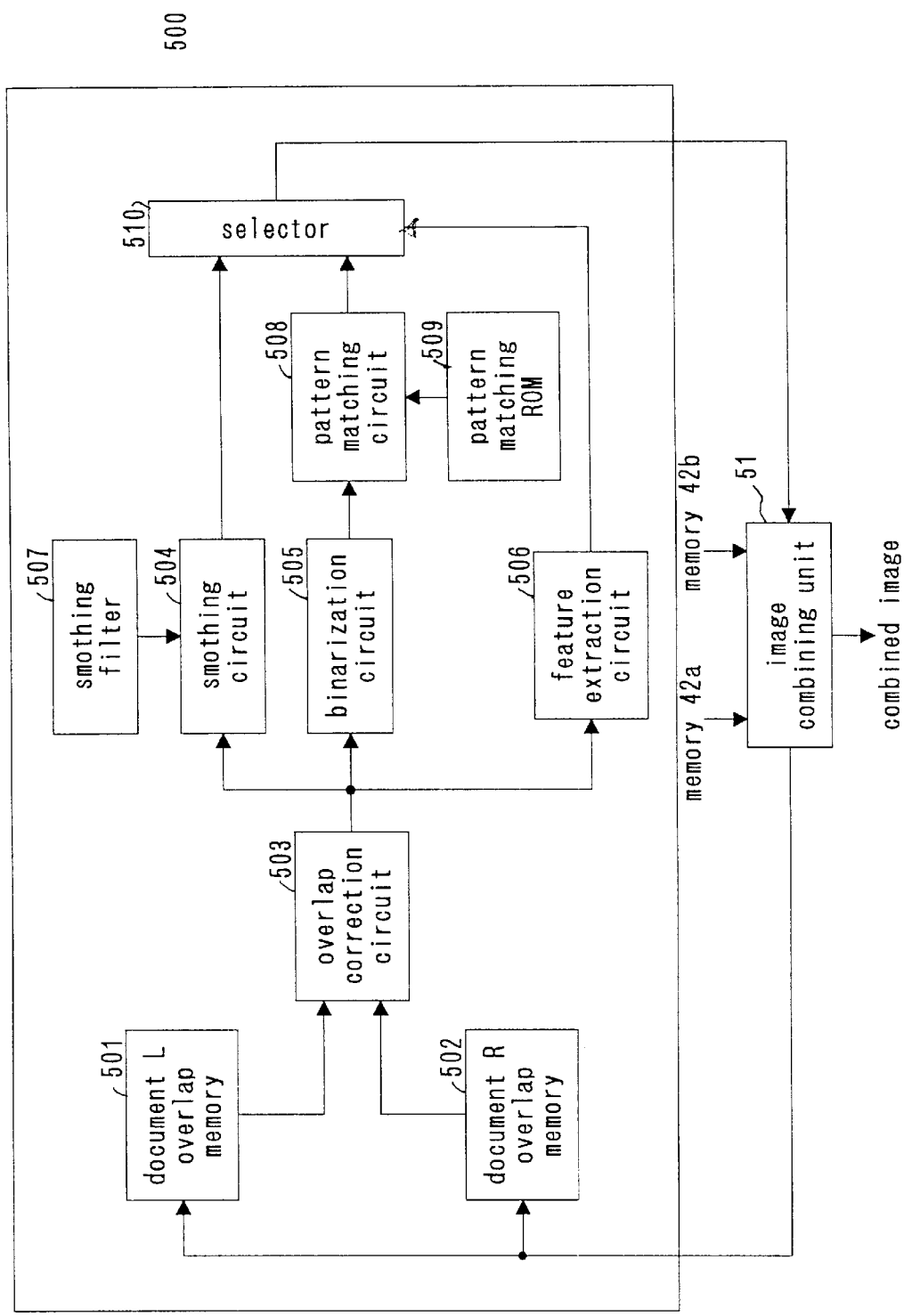
FIG. 8 shows details of overlap area correction unit 500.

Overlap area correction unit 500 is described in detail below with reference to FIG. 8. In overlap area correction unit 500, the data b are stored in document L overlap memory 501, and the data c are stored in document R overlap memory 502.

Then, the data b and data c stored in document L overlap memory 501 and document R overlap memory 502 are sequentially read out, and input to overlap correction circuit 503. In overlap correction circuit 503, overlap area data correction is accomplished based on the overlap correction data table shown in FIGS. 9 and 10.

FIGS. 9 and 10 show the overlap correction data table.

Methods for dividing and joining data into horizontal lines, vertical lines, and isolated patterns are determined beforehand for non-overlap data and overlap data stored in memories 501 and 502 within the overlaps. Thus, joining smoothness is improved.

Corrected data are transmitted to smoothing circuit 504, binarization circuit 505, and feature extraction circuit 506. The data transmitted to smoothing circuit 504 are subjected to a smoothing process based on the set smoothing filter 507. The data transmitted to binarization circuit 505 is subjected to a binarizing process then input to pattern matching circuit 508 and subjected to a pattern matching process based on data in pattern matching ROM 509. The data transmitted to feature extraction circuit 506 are examined via well-known methods to determine whether or not said data are text data, and the attribute information of data is input to selector 510.

The selector 510 transmits the output of smoothing circuit 504 and pattern matching circuit 508 to image combining unit 51 in accordance with the attribute information received from feature extraction circuit 506. That is, when the data are photographic data, the output of the smoothing circuit 504 is transmitted to image combining unit 51, whereas when said data are text data, the output of pattern matching circuit 508 is transmitted to image combining unit 51.

An image which simply joins the non-overlap area with an overlap area based on the overlap correction data table is an image wherein the border between the partial images is visible. Such an image is subjected to processing to reduce the border of the image in accordance with the image attributes of the photographic data or text data.

When three of more partial images are combined, the read partial image data of odd number lines are stored in image memory 42a, and the read partial image data of even number lines are stored in image memory 42b, and after the images are rapidly subjected to the aforesaid combining process, they are output from the device.

The positioning alignment of data comprising the joining line may be accomplished by inspecting the data of a predetermined line from the edge confronting the partial image data stored in image memories 42a and 42b, and recognizing the feature line segments and symbols so as to join two partial images.

When the entire area of a document is read in a single reading operation, the previously described process for combining partial image data is not executed, and after the read image data are stored in image memory 42a, said image data are stored in the image memory of image combining unit 51, and directly output from the device.

As previously described, each pixel within the aforesaid overlap area must have common addresses in image memory 42a and image memory 42b in order to select the image data with attributes of one or another of the partial images via control unit 52 and combine said data for storage in the image memory of image combining unit 51 based on the addresses expressing the boundary line of the overlap area and non-overlap area. Thus, for example, the inverse address of an address corresponding to an overlap portion from the final address of image memory 42a is subjected to an address shifting process and assigned as the top address of image memory 42b, so as to render the overlap area address a common address for image memory 42a and image memory 42b. Furthermore, the addresses of the overlap portion may be made common to both image memory 42a and image memory 42b by changing the image position reference for storage when storing said addresses in image memory 42a and image memory 42b.

2. Control

The control of the aforesaid device is described below with reference to FIGS. 5 and 6.

Figure 5:
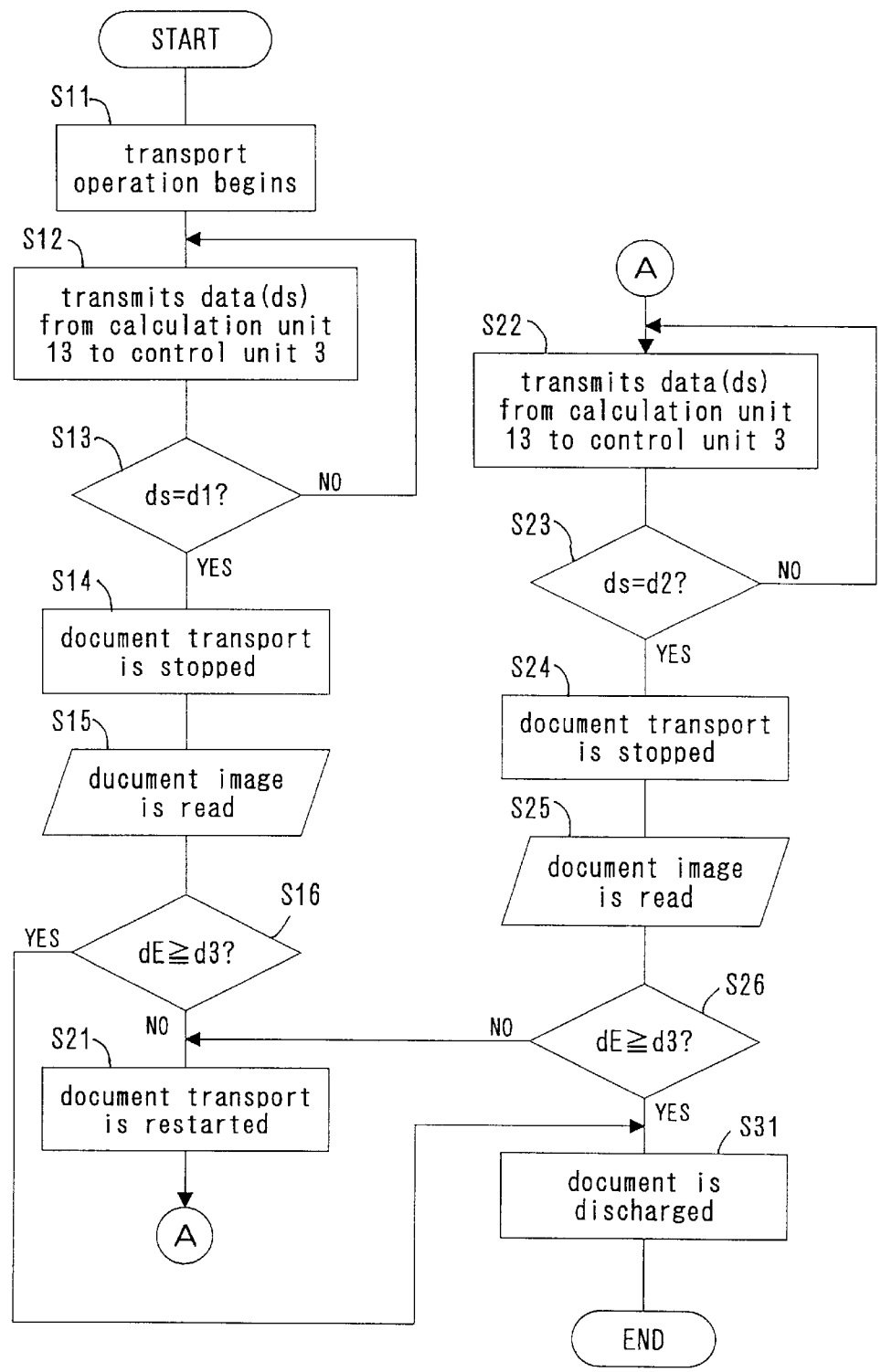
FIG. 5 is a flow chart showing the controls related to document transport of the image reading device of FIG. 1.
Figure 6:
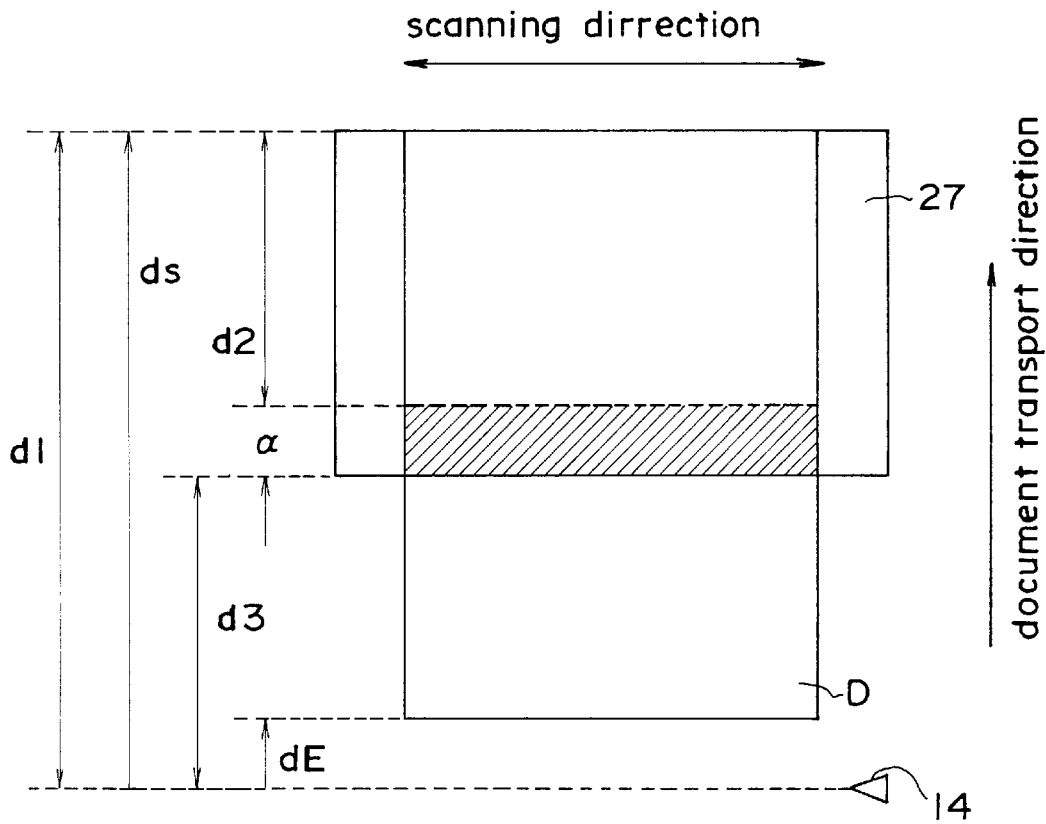
FIGS. 6(*a*) and 6(*b*) are illustrations corresponding to the flow chart of FIG. 5 showing the conditions of document transport and stopping.
Figure 6:
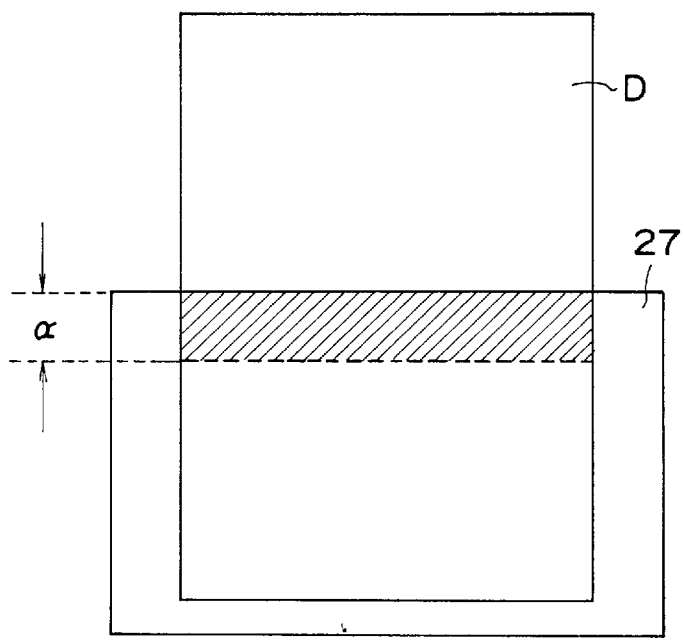

The processing shown in FIG. 5 begins when a start key (not illustrated) is pressed on operation panel 29 and the generated start signal is input to control unit 3.

First, the pulse motor 13 is turned ON, and the motor drive force is transmitted to feed roller 12 and transport belt 15. Thus, a document D stacked on document tray 11 is fed sheet by sheet and the transport operation begins (S11).

The rotation of pulse motor 13 is detected by a sensor (rotatory encoder or the like) not shown in the drawings, and the generated detection signal is input to the rotation detection unit 13a, and transmitted to calculation unit 13b as data expressing the number of motor rotations.

When the leading edge of a document fed by feed roller 12 is detected via its passage past the position of sensor 14, the generated detection signal is input to calculation unit 13b, and set as data for the timing of the passage of the document leading edge.

Calculation unit 13b calculates the amount of movement ds of a document from the moment the leading edge of said document has passed the position of sensor 14, and transmits said data to control unit 3 (S12).

The amount of movement ds of the document is calculated based on the number of rotations of the pulse motor 13.

The control unit 3 compares the amount of movement ds received from the calculation unit 13b with a first reference value d1 (S13). The first reference value d1 is the distance from the position of sensor 14 to the leading edge of glass document table 27 in the document transport direction, as shown in (a) of FIG. 6. In this example, the leading edge to the trailing edge of glass document table 27 in the document transport direction is described as the image reading range of CCD line sensor 24. When the result of the comparison in step S13 is that the amount of movement ds of the document is equal to the first reference value d1 (S13: YES), document transport is stopped (S14). This stopping of document transport may be realized by turning OFF the pulse motor 13, or may be realized by shutting off the clutch transmitting the drive force of pulse motor 13 to feed roller 12 and transport belt 15.

After document transport is stopped, the document image is read (S15). Although the document image reading operation and the processing of the read image signals (image processing and image combining) have been mentioned above, detailed description is omitted from the resent discussion.

When the reading of the document image ends, the movement amount dE of the document trailing edge is compared to a third reference value d3 (S16). The movement amount dE of the document trailing edge is the distance moved after the document trailing edge has passed the position of sensor 14 until document transport is stopped in step S14. The third reference value d3 is the distance from the position of sensor 14 to the trailing edge of glass document table 127 in the document transport direction, as shown in (a) of FIG. 6.

When the result of the comparison in step S16 is that the amount of movement dE of the document trailing edge is equal to or greater than the third reference value d3 (S16: YES), i.e., when the document trailing edge is on the glass document table 27 and consequently the document has been read to the trailing edge via the image reading operation of step S15 (S16: YES), the routine advances to step S31 inasmuch as there is no further need to read the current document (i.e., there is no remaining unread area of the current document). That is, the document on the glass document table 27 is transported so as to be ejected to discharge tray 16 (S31).

When the result of the comparison in step S16 is that the amount of movement dE of the document trailing edge is less than the third reference value d3 (S16: NO), i.e., when the trailing edge of the document has not yet arrived on the glass document table 27 (S16: NO), controls are executed for step S21 through S25 because must still be read.

First, document transport is restarted (S21).

The calculation unit 13b calculates the amount of movement ds of the document from the moment document transport is restarted (S22).

The control unit 3 compares the amount of movement ds received from the calculation unit 13b to a second reference value d2 (S23). The second reference value d2 is the distance from a position a predetermined distance α from the trailing edge of the glass document table 27 in the document transport direction (i.e., toward the leading edge) to the leading edge of document table 27 in the document transport direction, as shown in (a) of FIG. 6. That is, the area read in the previous image reading process (i.e, the image reading process of step S15); the distance from the leading edge in the document transport direction of the overlapped area to be read by the next image reading operation (i.e., image reading operation of step S25) to the leading edge of document table 27 in the document transport direction.

When the result of the comparison in step S23 is that the amount of movement ds of the document is equal to the second reference value d2 (S23: YES), document transport is stopped (S24). This condition is shown in (b) of FIG. 6. After document transport is stopped, the document image is read (S25).

The reading of a second image of the current document is accomplished so as to include an overlap portion of predetermined width α of the first image reading, and again comparing the amount of movement dE of the document trailing edge to the third reference value d3 (S26). When the result of the comparison is that the amount of movement dE of the document trailing edge is equal to or greater than the third reference value d3 (S26: YES), the routine advances to step S31 inasmuch as there is no further need to read the current document, and the document is ejected.

On the other hand, when the result of the comparison in step S26 is that the amount of movement dE of the document trailing edge is less than the third reference value d3 (S26: NO), steps S21 through S25 are again executed because there is no further need to read the current document (i.e., there is no unread area remaining in the current document), the determination of step S26 is accomplished, and identical processing follows thereafter.

Thus, a document is set and sequentially read so as to have mutually overlapping areas (i.e., predetermined width α in the document transport direction) for each size (d2+α) on document table 27 comprising the reading range in the document transport direction. Each read partial image is combined and output as previously described. Since the document transport direction and scanning direction of the reading device are perpendicular, and since the overlap area is formed along the scanning direction of the reading device in the present device, deterioration of resolution can be avoided and composite images having smooth seams can be obtained.

Furthermore, although each divided image is read and joined so as to have a mutual overlap area, may be read and joined without an overlap area by similar execution using the ADF.

In the present invention, a document is transported after a previous reading operation ends so that an area read as a trailing edge area in a previous reading operation can be read as a leading edge area in the next reading operation, thereby simply and reliably suppressing dislocation and maintaining excellent accuracy of the overlap area near the joint boundary of each partial image corresponding to each reading operation without complex processing. Thus, the joint boundary of each partial image can be determined and connected with precision.

The foregoing description is provided to assist a thorough comprehension of the present invention and is not intended as limiting. The present invention includes the aforesaid embodiments and equivalents.

What is claimed is:

1. An image reading apparatus comprising:
   a document table;
   means for automatically transporting a document onto the document table and transporting said document in the same direction after a reading operation to remove the document from the document table;
   means for reading an image of the transported document;
   means for combining a plurality of partial images which are read by the reading means;
   means for controlling the transporting means comprising means for sequentially feeding the document so as to have mutually overlapping areas of a predetermined width in the document transporting direction; and
   means for managing the combining means to combine the image which is read by the reading means during the first reading operation with the image which is read by the reading means during the second reading operation.

2. The image reading apparatus of claim 1 wherein the reading means includes a first memory storing first data which is generated by the first reading operation and a second memory storing second data which is generated by the second reading operation, and the combining means combines the first data with the second data through a predetermined correction.

3. The image reading apparatus of claim 2 wherein the predetermined correction is changed by the result of the reading means.

4. The image reading apparatus of claim 3 wherein the predetermined correction is changed when the result of the reading means shows a horizontal line image.

5. The image reading apparatus of claim 3 wherein the predetermined correction is changed when the result of the reading means shows a vertical line image.

6. The image reading apparatus of claim 3 wherein the predetermined correction is changed when the result of the reading means shows a oblique line image.

7. The image reading apparatus of claim 3 wherein the predetermined correction is changed when the result of the reading means shows an isolated image.

8. The image reading apparatus of claim 1 wherein the managing means manages the combining means so that the image which is read by the reading means during the first reading operation is combined with the image which is read by the reading means during the second reading operation according to a predetermined pattern table.

9. An image reading apparatus comprising;

a document table;

means for automatically transporting a document onto the document table and transporting said document in the same direction after the reading operation to remove the document from the document table;

means for reading an image of the transported document within a reading range;

means for combining a plurality of partial images which are read by the reading means;

means for judging whether a trailing edge area of the document is out of the reading range; and means for controlling the transporting means comprising means for sequentially feeding the document so as to have mutually overlapping areas of a predetermined width in the document transporting direction when the judging means judges the trailing edge area of the document is outside of the reading range.

10. The image reading apparatus of claim 9 further comprises means for managing the combining means to combine the image which is read by the reading means during the first reading operation with the image which is read by the reading means during the second reading operation.

11. The image reading apparatus of claim 9 wherein the reading means includes a first memory storing first data which is generated by the first reading operation and a second memory storing second data which is generated by the second reading operation, and the combining means combines the first data with the second data through a predetermined correction.

12. The image reading apparatus of claim 9 wherein the predetermined correction is changed by the result of the reading means.

13. An image reading apparatus comprising:

a document table;

means for automatically transporting a document onto the document table and transporting said document in the same direction after the reading operation to remove the document from the document table such that the document is sequentially fed in a manner so as to have mutually overlapping areas of a predetermined width in the document transporting direction;

means for reading the image of the transported document;

means for combining a plurality of partial images which are read by the reading means;

means for managing the combining means to combine the image which is read by the reading means during the first reading operation with the image which is read by the reading means during the second reading operation.

14. The image reading apparatus of claim 13 wherein the reading means includes a first memory storing first data which is generated by the first reading operation and a second memory storing second data which is generated by the second reading operation, and the combining means combines the first data with the second data through a predetermined correction.

15. The image reading apparatus of claim 13 wherein the predetermined correction is changed by the result of the reading means.

* * * * *